(12) United States Patent
Brockman et al.

(10) Patent No.: US 6,625,260 B1
(45) Date of Patent: Sep. 23, 2003

(54) SYSTEM AND METHOD TO ENABLE THE CALLING PARTY TO CHANGE THE CONTENT OF PREVIOUSLY RECORDED VOICE MAIL MESSAGES

(75) Inventors: Richard James Brockman, Naperville, IL (US); Phillip Michael Sands, Champaign, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,509

(22) Filed: Oct. 29, 1999

(51) Int. Cl.[7] ................................................. H04M 1/64
(52) U.S. Cl. ............................. 379/88.21; 379/88.23; 379/142.06
(58) Field of Search .......................... 379/88.19, 88.21, 379/88.26, 88.22, 88.2, 88.18, 88.12, 88.25, 88.23, 142.01–142.18, 207.15

(56) References Cited

U.S. PATENT DOCUMENTS 5,333,180 A * 7/1994 Brown et al. ............ 379/88.06
5,355,406 A * 10/1994 Chencinski et al. ...... 379/88.27
5,857,016 A * 1/1999 Jedlicka .................. 379/142.01
6,526,127 B1 * 2/2003 Piotrowski et al. ...... 379/88.22
6,546,085 B1 * 4/2003 Brockman ............... 379/88.13

* cited by examiner

Primary Examiner—Fan Tsang
Assistant Examiner—Marky M Kidd

(57) ABSTRACT

A system and method that enables a calling party to change the content of previously recorded voice mail messages by receiving telephone calls and comparing an incoming caller ID with all caller IDs stored in a database. If the caller ID matches, then the calling party is presented with a menu of options. The menu may include listening to the previous message, deleting the previous message, modifying the previous message and/or recording a new message. A user can change or modify a previously recorded message and determine whether the message has been received by the called party, thus providing a more flexible interface for leaving messages.

9 Claims, 3 Drawing Sheets

SYSTEM AND METHOD TO ENABLE THE CALLING PARTY TO CHANGE THE CONTENT OF PREVIOUSLY RECORDED VOICE MAIL MESSAGES

FIELD OF THE INVENTION

This invention relates to the field of voice mail and answering machines and, more specifically, to the area of enhancing calling party control of message content.

BACKGROUND OF THE INVENTION

Many, if not most, telephone subscribers have some form of message service that records a message when no one answers the telephone. This service may be in the form of an answering machine connected to the telephone line at the customer premise or may be a voice mail system in the public switched telephone network (PSTN). This service has enabled subscribers to perform many tasks and leave information without actually having to be physically present.

A problem with these voice mail systems, however, is that as soon as the calling party hangs up, frequently he or she wants to or needs to change the message. For example, a meeting time may change or may have been stated incorrectly in the original message.

Currently, the only thing that a calling party can do is record a second message and hope that the called party listens to all messages before acting on the first message. Furthermore, there are situations where a person's voice mail system becomes overloaded and the voice mail server or the answering machine no longer accepts messages. In these cases, the calling party cannot correct the message at all.

Therefore, there is a need in the art for allowing calling parties to change or cancel a previously recorded voice mail message.

SUMMARY OF THE INVENTION

This problem is solved and a technical advance is achieved in the art by a system and method that enables the calling party to change the content of previously recorded voice mail messages. This advance is achieved by a voice mail system that receives incoming telephone calls and compares an incoming caller ID with caller ID's stored in conjunction with previous messages. If a caller ID of the incoming call matches a caller ID in the database, (i.e., the calling party has previously left a message) then the calling party is presented with a menu of options. The menu may include determining whether the called party has listened to the message, deleting the message, modifying the message and/or recording a new message. In this manner, a calling party can change or modify a previously recorded message and determine whether the message has been received by the called party, thus providing a more flexible interface for leaving messages.

BRIEF DESCRIPTION OF THE DRAWINGS

A more complete understanding of the invention may be obtained from the following description taken in conjunction with the drawings, in which.

DETAILED DESCRIPTION

Figure 1:
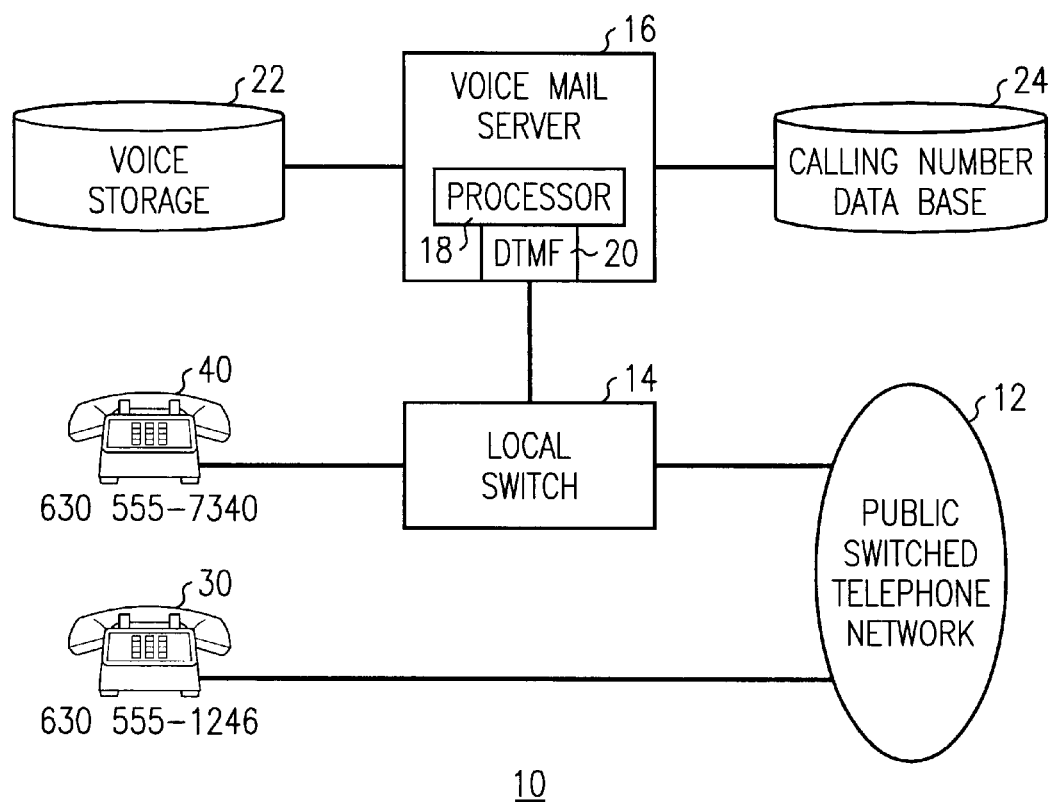
FIG. 1 is a block diagram of a telephone network in which an exemplary embodiment of this invention may operate.

FIG. 1 is a block diagram of a telephone network 10 in which an exemplary embodiment of this invention is implemented. Telephone network 10 comprises a public-switched telephone network (PSTN) 12, which consists of telephone switching systems, local and long distance networks, etc. as is known in the art. For purposes of explaining this invention, a local telephone switch (local switch) 14 is connected to the PSTN 12. In order to provide a telephone answering service to its customers, the local switch 14 is connected to a voice mail server 16.

Voice mail server 16 includes a processor 18, which controls the operation of voice mail server 16. A dual-tone multifrequency (DTMF) detector 20 is also connected in the voice path through voice mail server 16. Voice mail server 16 includes a recording and storage device 22 for storing outgoing voice prompts and incoming messages, as known in the art. Voice mail server 16 also includes a storage device 24 containing calling number identifications associated with messages. Telephone network 10 provides telephony service to telephones 30 and 40.

According to an exemplary embodiment of this invention, the subscriber of telephone 40 subscribes to voice mail service. Telephone 30 is assigned the directory number 630-555-1246 and telephone 40 is assigned the directory number 630-555-7340. When the user of telephone 30 goes offhook and dials 630-555-7340, the call is forwarded through PSTN 12 to local switch 14. The calling line ID "630-555-1246" is also forwarded through the PSTN 12 to local switch 14. Local switch 14 applies a ringing signal to telephone 40. After a predetermined number of rings, local switch 14 forwards the call to voice mail server 16. Alternatively, local switch 14 may forward the call immediately (without ringing telephone 40) either if requested by the user of telephone 40 or if telephone 40 is busy. The calling line ID of telephone 30 is also forwarded to voice mail server 16.

The processor 18 of voice mail server 16 compares the calling line ID (630-555-1246) to calling line ID's stored in calling number database 24 for this telephone destination (telephone 40). If the calling line ID is in database 24, then a message was previously left from the calling party at telephone 30 for the called party telephone 40. A menu of options is presented from voice storage 22 to the calling party telephone 30. The options may include determining whether one or more messages have been retrieved by the called parties, playing back one or more messages previously recorded, deleting one or more previous messages, changing one or more previous messages and, of course, leaving another message. The calling party at telephone 30 signals to voice mail server 16 his or her choice through DTMF signaling as is known in the art and translated at DTMF detector 20. Processor 18 receives the choice of the calling party from DTMF detector 20 and effects the desired operation. In this manner, a service that is not previously available, checking whether a call has been answered and the ability to delete and add messages previously delivered, is provided.

Figure 2:
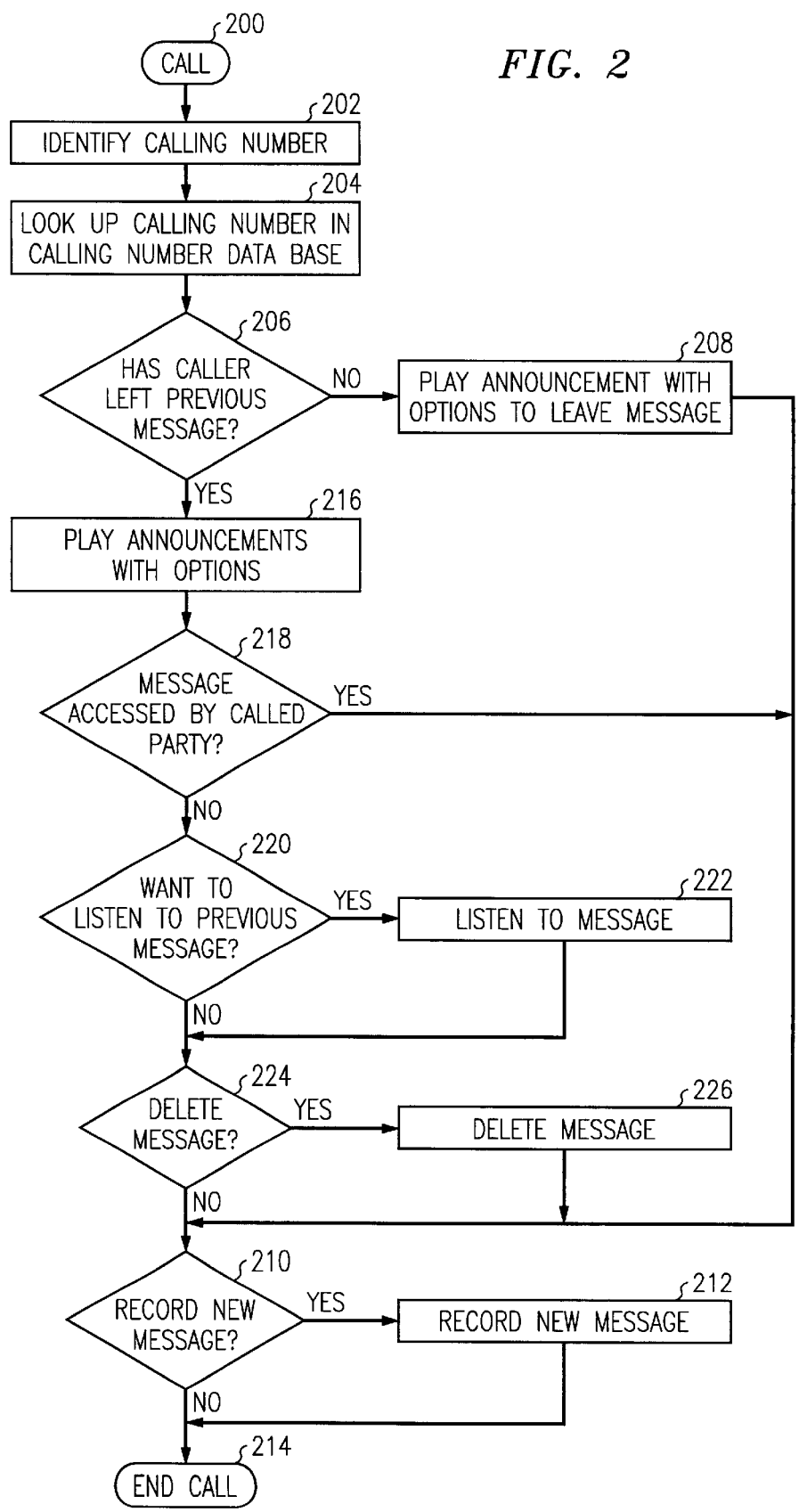
FIG. 2 is a flowchart of operation of this invention in the voice mail system of FIG. 1.

Turning now to FIG. 2, one exemplary flow of operations as performed in processor 18 of voice mail server 16 is shown. A call arrives at circle 200, and, at action box 202, the calling number is identified. In action box 204, the processor performs a lookup in the calling number database.

In decision diamond 206, a determination is made if the caller has previously left a message if a match being found in the calling number database. If the caller has not previously left a message, then, in action box 208, an announcement is played with the option to leave a message. A determination is made in decision diamond 210 whether the calling party wants to record a new message and, if so, a message is recorded in action box 212. If not, the call ends in circle 214.

If it is determined in decision diamond 206 that the caller has left one or more previous messages, then processing proceeds to action box 216 where an announcement with options is played. The following decision diamonds are examples of selections that a calling party could make, but is not meant to be an all-inclusive list. First in decision diamond 218, a determination is made whether the message has been listened-to by the called party. If the message has already been accessed, then there is no point in manipulating the message and call processing moves to a determination whether a new message is to be recorded.

If the message has not been accessed in decision diamond 218, then a determination is made if the user wants to listen to the message in decision diamond 220. If so, the message is played back to the calling party in action box 222. A determination is then made in decision diamond 224 whether that message is to be deleted. If so, the message is deleted in action box 226. Optionally, this procedure may loop back to decision diamond 218 if there is more than one message left by the calling party.

Figure 3:
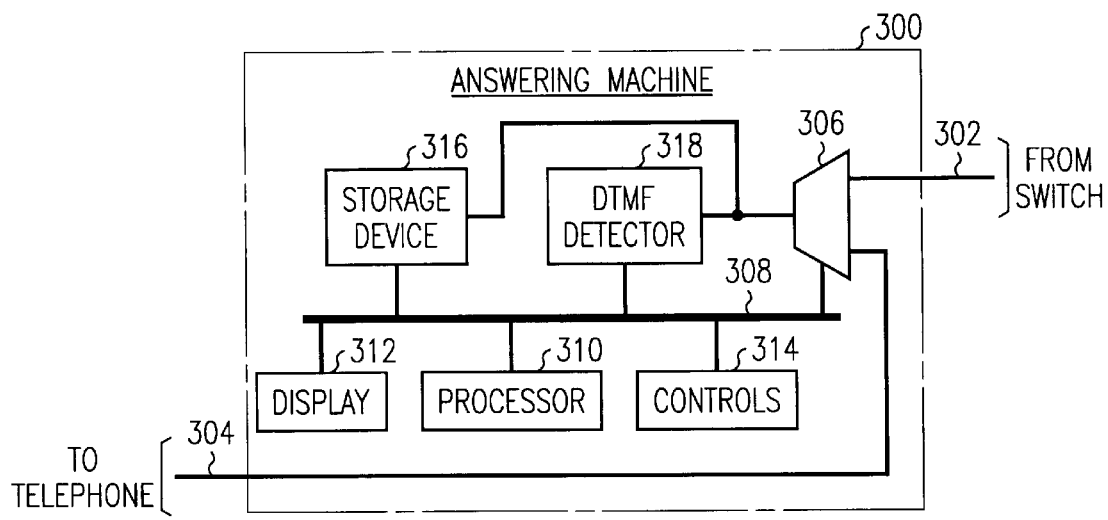
FIG. 3 is a block diagram of an exemplary embodiment of this invention integrated into an answering machine.

FIG. 3 illustrates an answering machine embodiment according to this invention. Answering machine 300 is connected to the telephone network via line 302 connected to a switch, e.g., switch 14, FIG. 1. The answering machine 300 is also connected to a telephone device via line 304. A switch 306 connects to both the incoming line to the telephone line 304 and to the answering machine. In this case, a processor 310 is connected to bus 308 along with display 312 and control 314. Processor 310 generally controls the operation of answering machine 300 and displays status on display 312 and accepts manual input control from the user at control 314.

Processor also controls storage device 316 to play messages to line 302 and to accept voice input from line 302. The storage device may be e.g., several tape drives, or, in more modern answering machines, a memory.

DTMF Detector 318 is also connected to the incoming line 308 to be able to analyze the line for DTMF signaling as is known in the art and discussed above. Alternatively, processor 310 could have DTMF detector ability built in.

It is to be understood that the above-described embodiments are merely illustrative principles of the invention, and that many variations may be devised by those skilled in the art without departing from the scope of this invention. For example, a voice mail server is illustrated in the context of a network switch. It is within the preview of one skilled in the art to apply this invention to wireless voice messaging and PBX voice messaging. It is, therefore, intended that such variations included within the scope of the following claims.

What is claimed is:

1. A method for use in a voice mail system comprising the steps of:
   receiving an incoming call from a party
   if a called party answers, completing the call to the called party;
   if the called party does not answer determining whether the calling party previously left one or more messages;
   presenting the calling party with a menu of actions if the calling party previously left a message; and
   changing the one or more messages according to instructions from the calling party;
   wherein a calling line identification of the calling party is delivered with the call, and wherein the step of determining whether the calling party previously left one or more messages comprises comparing the calling line identification with a data base of calling line identifications associate with messages.

2. A method in accordance with claim 1 further including the step of informing the calling party whether the one ox more messages have been listened to.

3. A method in accordance with claim 1 wherein the step of changing one or more messages comprises deleting one or more messages.

4. A method in accordance with claim 1 wherein the step of changing one or more messages comprises recording one or more messages.

5. A method in accordance with claim 1 further including the step of recording an additional message.

6. A voice mail apparatus comprising:
   a recording and storing device for recording and playing back messages;
   a calling line identification memory device configured to store a calling line identification received and associated with each recorded message;
   means connected to said recording device and said calling line identification memory device configured to receive a calling line identification for determining whether the received calling line identification is stored in the calling line identification memory device;
   means responsive to the determining means determining that the received calling line identification is store for presenting the calling party with a menu of options for changing the content of a previously recorded message; and
   means responsive to input from the calling par for changing the previously recorded message.

7. An apparatus according to claim 6 further including a DTMF detector connected to the means for changing the previously recorded message configured to interpret DTMF input from the calling party.

8. An apparatus according to claim 6 including communications means to connect said apparatus to a telephone switching system.

9. An apparatus according to claim 6 including a housing for use as customer premises equipment as a telephone answering machine.

* * * * *